United States Patent
Staszewski et al.

(10) Patent No.: US 8,000,670 B2
(45) Date of Patent: Aug. 16, 2011

(54) REMOVING CLOSE-IN INTERFERERS THROUGH A FEEDBACK LOOP

(75) Inventors: Robert B. Staszewski, Garland, TX (US); Khurram Muhammad, Richardson, TX (US); Dirk Leipold, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 980 days.

(21) Appl. No.: 11/339,386

(22) Filed: Jan. 25, 2006

(65) Prior Publication Data
US 2006/0135107 A1    Jun. 22, 2006

Related U.S. Application Data

(62) Division of application No. 10/280,156, filed on Oct. 25, 2002, now Pat. No. 7,218,904.

(60) Provisional application No. 60/348,902, filed on Oct. 26, 2001.

(51) Int. Cl.
*H04B 1/06* (2006.01)

(52) U.S. Cl. .............. 455/232.1; 455/296; 375/346; 375/348; 375/374

(58) Field of Classification Search .......... 455/232.1
See application file for complete search history.

(56) References Cited

U.S. PATENT DOCUMENTS

| | | | | |
|---|---|---|---|---|
| 4,319,360 A * | 3/1982 | Cointot | | 375/245 |
| 5,117,691 A | 6/1992 | Fraser | | |
| 5,469,471 A | 11/1995 | Wheatley, III | | |
| 5,657,026 A * | 8/1997 | Culpepper et al. | | 342/374 |
| 5,689,355 A | 11/1997 | Okubo et al. | | |
| 5,995,567 A * | 11/1999 | Cioffi et al. | | 375/346 |
| 6,166,367 A * | 12/2000 | Cho | | 250/208.1 |
| 6,466,631 B1 * | 10/2002 | Schenk | | 375/346 |
| 2005/0152560 A1* | 7/2005 | Chi | | 381/73.1 |
| 2007/0124139 A1* | 5/2007 | Chen | | 704/219 |

* cited by examiner

*Primary Examiner* — Duc Nguyen
*Assistant Examiner* — Ajibola Akinyemi
(74) *Attorney, Agent, or Firm* — Ronald O. Neerings; Wade James Brady, III; Frederick J. Telecky, Jr.

(57) ABSTRACT

System and method for elimination of close-in interferers through feedback. A preferred embodiment comprises an interferer predictor (for example, interferer predictor 840) coupled to a digital output of a direct RF radio receiver (for example, radio receiver 800). The interferer predictor predicts the presence of interferers and feeds the information back to a sampling unit (for example, sampling unit 805) through a feedback circuit (for example, feedback unit 845) through the use of charge sharing. The interferers are then eliminated in the sampling unit. Additionally, the number and placement of zeroes in a filter in the sampling unit is increased and changed through the implementation of arbitrary-coefficient finite impulse response filters.

19 Claims, 6 Drawing Sheets

REMOVING CLOSE-IN INTERFERERS THROUGH A FEEDBACK LOOP

This application is a Divisional of application Ser. No. 10/280,156, filed Oct. 25, 2002 now U.S. Pat. No. 7,218,904, which claims the benefit of U.S. provisional application number 60/348,902 filed on Oct. 26, 2001, entitled "Direct RF Sampling with Recursive Filtering Method", which application is hereby incorporated herein by reference.

TECHNICAL FIELD

The present invention relates generally to a system and method of radio frequency (RF) direct sampling radios, and more particularly to a system and method for removing interferers that are in close proximity to a desired signal via the use of feedback and changing from constant-coefficient FIR filtering to arbitrary-coefficient FIR filtering.

BACKGROUND

Generally, discrete-time radio frequency (RF) is a newly emerging field in wireless digital communications wherein analog continuous-time RF signals that are transmitted over-the-air are directly sampled into a discrete-time sample stream suitable for digital signal processing. A typical wireless digital communications device would use analog filters, duplexers, mixers, analog-to-digital converters (ADC), etc. to convert the analog continuous-time RF signals into a digital data stream that is suitable for digital signal processing. Unfortunately, analog circuit components, especially components such as capacitors, inductors, resistors, etc. necessary for the analog filters are difficult to integrate into an integrated circuit. This is especially true for the precise values of these components required for use in filters. Of course, it is the desire of the manufacturer to maximize the degree of integration for the wireless transceivers. This is because the more highly integrated a wireless transceiver can become, the lower the production costs for the transceiver and the transceiver will typically use less power during operation.

Discrete-time RF involves the direct conversion of the analog continuous-time RF signal into discrete-time sample stream through the use of a direct sampling mixer, without having to undergo any intermediate analog continuous-time filtering, downconversion, etc. An example of a direct RF sampling mixer is one that uses current to perform its sampling. The current-mode direct sampling mixer converts the received analog continuous-time RF signal into a current that is then integrated by a sampling capacitor. The charge on the sampling capacitor is then periodically read to produce the discrete-time sample stream.

The analog continuous-time RF signal being directly converted into a discrete-time sample stream may often contain more than a desired signal located in a frequency band of interest (commonly referred to as a signal of interest). In many circumstances, there are interferers along with the signal of interest being sampled by the direct RF sampling mixer. The interferers may be the result of noise sources, such as other radio frequency devices and communications networks operating in close proximity with the direct RF sampling mixer, large electrical motors, electrical appliances, etc. The interferers may be located relatively far away from the signal, close to the signal (commonly referred to collectively as out-of-band interferers), or they may actually occur at frequencies that also carry the signal (commonly referred to as in-band interferers).

In the case when the interferers are in-band, active interferer detection and cancellation may be an only option for removing the interferers. However, when the interferers are out-of-band, filtering can be used to eliminate the interferers.

Filtering can be used to eliminate interferers that are out-of-band, and can take place either in an analog domain or a digital domain. Analog filtering occurs early on, perhaps as early as immediately after the analog RF signal is received by an antenna. Digital filtering, on the other hand, can only occur after the discrete-time sample stream created from the analog RF signal has been converted into a digital data stream. This implies that any digital filtering that is to take place, must occur later in the signal processing sequence.

A problem that is associated with out-of-band interferers is that, while they may have no direct impact on the signal of interest, they may be significantly larger in magnitude than the signal of interest. If this is the case, then it is required that certain RF front-end electronics, such as amplifiers, have good linearity. Linearity is required so that the presence of the large interferers do not distort the performance of the RF front-end electronics in such a way that the electronics do not operate properly on the relatively smaller signal magnitudes of the signal of interest. If the out-of-band interferers are eliminated, then the linearity of the RF front-end electronics can be relaxed due to a reduction of the overall dynamic range of the signal being provided to the electronics, e.g., only the dynamic range of the signal of interest must be dealt with by the front-end electronics.

The direct conversion of the analog continuous-time RF signal into a discrete-time sample stream by the direct RF sampling mixer can include a built-in finite impulse response (FIR) filtering operation. The FIR filtering comes as a result of an accumulation and decimation of multiple samplings of the analog RF signal into a single discrete-time sample by a sampling capacitor. However, the direct RF sampling of the analog RF signal using fixed current gains and constant capacitive loads may result in only FIR filter with constant coefficients. In many occasions, it is desired that arbitrary-coefficient filtering be available to help eliminate interferers, anti-aliasing, etc. Additional filtering can be added, but only with the expense of additional hardware.

One disadvantage of the prior art is that the use of analog filters to eliminate out-of-band interferers can entail the use of high-order analog filters if the out-of-band interferers are close to the signal of interest. High-order analog filters can be difficult to implement, especially on an integrated circuit.

A second disadvantage of the use of analog filters to eliminated out-of-band interferers is that while low-order analog filters can be realized relatively easily, but they are likely to not be able to remove the close-in interferers, therefore, the requirement of good linearity in the RF front-end electronics must be maintained.

A disadvantage of constant-coefficient FIR filtering is that the filtering may have high sidelobes and an insufficient roll-off rate to help eliminate aliasing and/or interferers. Additional filtering can be added to perform these needed tasks, but constant-coefficient filters with low cut-off frequencies are difficult to realize in integrated circuits.

SUMMARY OF THE INVENTION

These and other problems are generally solved or circumvented, and technical advantages are generally achieved, by preferred embodiments of the present invention which use feedback to eliminate close-in interferers and provides arbitrary-coefficient FIR filtering without the addition of a significant amount of hardware.

In accordance with a preferred embodiment of the present invention, a method for providing filtering in a current-mode sampling mixer comprises 1) providing a received radio frequency (RF) current, 2) coupling the RF current to a first load for a first period of time to accumulate a charge on the first load, 3) decoupling the RF current from the first load, 4) coupling the RF current to a second load for a second period of time to accumulate a charge on the second load, 5) reading the accumulated charge on the first load, 6) decoupling the RF current from the second load, 7) reading the accumulated charge on the second load, and 8) repeating 2-8.

In accordance with another preferred embodiment of the present invention, a current-mode sampling mixer comprises an amplifier to produce a current based on a radio frequency (RF) signal, a plurality of loads, each load switch-ably coupled to the amplifier, each load containing circuitry to accumulate a charge based on the current, and a plurality of charge read-out circuits, each charge read-out circuit switch-ably coupled to a load, the charge read-out circuit to permit extraction of the charge accumulated on the load.

In accordance with yet another preferred embodiment of the present invention, a method for removing interferers comprises creating a discrete-time sample stream (DTSS) from an analog continuous-time radio frequency (RF) signal, converting the DTSS into a digital data stream (DDS), predicting a presence of interferers in the DDS, feeding back information about the predicted interferers, and eliminating the predicted interferers from the DTSS.

In accordance with another preferred embodiment of the present invention, a radio frequency (RF) radio receiver comprises a signal input, a sampling unit coupled to the signal input, the sampling unit containing circuitry to convert an analog signal provided by the signal input into a discrete-time sample stream (DTSS), a signal processing unit coupled to the sampling unit, the signal processing unit containing circuitry to filter and convert the DTSS into a digital data stream (DDS), an interferer predictor unit coupled to an output of the signal process unit, the interferer predictor unit containing circuitry to detect and provide information regarding interferers in the DDS, and a feedback circuit having an input coupled to the interferer predictor unit and an output coupled to the sampling unit, the feedback circuit containing circuitry to provide the information produced by the interferer predictor unit to the sampling unit An advantage of a preferred embodiment of the present invention is that close-in interferers are eliminated from a signal of interest through the use of a feedback signal. This permits a relaxation of linearity requirements for RF front-end electronics. Electronics with lower linearity requirements are less expensive and easier to realize in integrated circuits. This relaxation of the linearity of the RF front-end electronics can be achieved by linearizing a sampling circuit portion of the direct RF sampling circuit itself.

A further advantage of a preferred embodiment of the present invention is that the need for a high-order analog filter to remove the close-in interferers have been eliminated and a low-order analog filter can be used in its place to simply remove interferers that are far away from the signal of interest. As noted previously, low-order analog filters can be realized easier and less expensively in an integrated circuit.

Yet another advantage of a preferred embodiment of the present invention is that the use of feedback to eliminate close-in interferers is that the feedback is dynamic, meaning that if the signal of interest and/or the interferers move, then the feedback can readily reflect this and the interferer elimination can adjust. The use of analog filters is generally not dynamic (since parameters of analog filters can sometimes be adjusted, but not without restriction) and is normally set once the analog filters are designed.

Yet another advantage of a preferred embodiment of the present invention is that the overall power consumption is reduced by reducing the complexity of the analog filters and the linearity of the RF front-end electronics.

An additional advantage of a preferred embodiment of the present invention is that the increase in the length of the FIR filtering comes with minimal additional hardware, therefore, additional filtering performance is gained at minimal costs.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a direct RF sampling mixer operating in a 2.4 Gigahertz frequency band in a radio receiver that is adherent to the Bluetooth technical standards. The Bluetooth technical standard specifies a short-range wireless communications network whose intended purpose is a low-power and low-cost replacement for physical cabling. The Bluetooth technical standard is specified in a document entitled "Specification of the Bluetooth System, Version 1.1, Feb. 22, 2001," which is incorporated herein by reference. The invention may also be applied, however, to other wireless systems, such as global positioning systems (GPS), low-earth orbit satellite system based communications systems, and cellular based systems that may include first, second, and third generation (and beyond) digital telephone systems, time-division multiple access (TDMA), code-division multiple access (CDMA), global system for mobile communications (GSM) technology along with other digital communications technologies operating at various carrier frequencies. Additionally, the receiver mixer of the present invention has application in wired receivers as well.

Figure 1A:
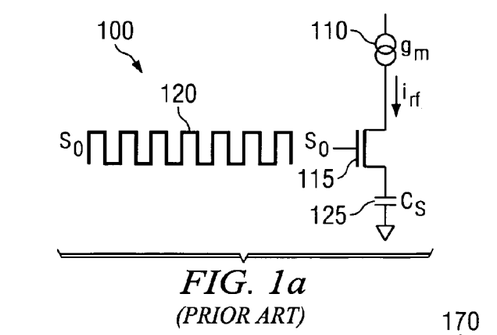
FIGS. 1a and 1b are prior art diagrams of current-mode sampling mixers.

With reference now to FIG. 1a, there is shown a block diagram illustrating a prior art embodiment of a current-mode direct sampling mixer 100. The mixer 100 includes an amplifier 110 (sometimes referred to as a low-noise transconductance amplifier (LNTA), or simply transconductance amplifier), an RF switch 115 driven by a signal 120 generated by a local oscillator (not shown), and a sampling capacitor ($C_S$) 125. An alternative version of the mixer 100 exists wherein an antenna (not shown) is coupled to the amplifier, the antenna is used to receive analog continuous-time RF signals transmitted over-the-air. The direct electrical coupling provides a direct signal path from the antenna into the mixer 100.

An analog continuous-time RF signal that is provided to the mixer 100 (the analog RF signal may be provided to the mixer 100 via a direct wire or cable connection or transmitted over-the-air) in the form of an RF voltage that is then converted into an RF current by the LNTA 110, which has a transconductance gain of $g_m$. The flow of the RF current is switched by the RF switch 115, which is driven by the signal 120 generated by a local oscillator (LO). The frequency of the signal 120 is referred to as a sampling frequency and is commonly denoted $f_S$. The sampling frequency is normally approximately equal to the frequency used to create the analog RF signal.

Figure 1B:
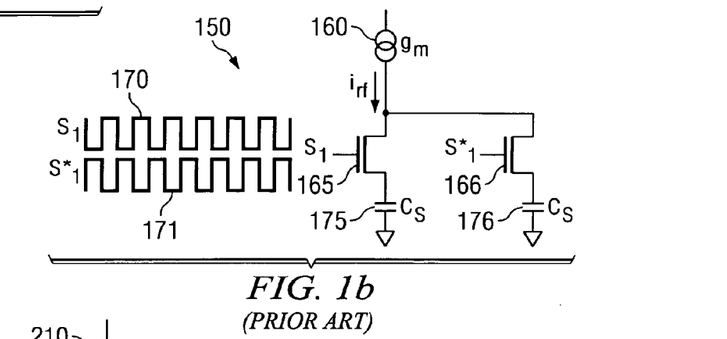

As displayed in FIG. 1a, when the signal 120 is high, the RF switch 115 is closed, creating a path for the RF current. The RF current is integrated by the sampling capacitor 125, increasing (or decreasing) the charge on the sampling capacitor 125, depending on the direction of the current flow. It is possible to view the integration of the RF current by the sampling capacitor 125 conceptually as the injection of an electrical charge packet that is proportional to the windowed (or gated) RF energy into the sampling capacitor 125. These electronic charge packets increase (or decrease) the charge on the sampling capacitor 125 depending on the charge polarity. In order to fully sample the analog continuous-time RF signal, an identical current-mode sampling mixer with an RF switch that is driven by an inverse (or complement) of the signal generated by the LO is used. The identical current-mode sampling mixer is used to sample the analog RF signal when the current-mode sampling mixer 100 is decoupled from the LNTA 110 by the RF switch 115 when the signal 120 is low, as shown in FIG. 1b.

The charge that is integrated on the sampling capacitor 125 is periodically read out to produce a single sampled data value. The frequency of the charge read out can vary from being equal to the frequency of the signal 120 to some integer divisor of the frequency of the signal 120. The periodic reading out of the charge on the sampling capacitor 125 produces a discrete-time sample stream of the analog RF signal.

Unfortunately, when the charge on the sampling capacitor 125 is being read out, the sampling capacitor 125 cannot be used to integrate the RF current, or vice versa. Therefore, the current-mode sampling mixer 100 as displayed in FIG. 1a does not permit the reading of the charge accumulated on its sampling capacitor 125 while the signal 120 is actively switching. Also, the amount of time required to read the charge from the sampling capacitor 125 is typically longer than the amount of time to integrate the RF current, i.e., half of the period of the signal 120. Therefore, it is normally not feasible to attempt a charge read out while the signal 120 is inactive.

Notice that the switches, both RF and non-RF switches, displayed in the figures and discussed in this specifications are displayed as n-type metal oxide semiconductor (NMOS) transistor switches. However, these switches may be made out p-type metal oxide semiconductor (PMOS) or complementary metal oxide semiconductor (CMOS) transistor pass gates as well without loss in performance or generality. Of course, the use of other types of switches may require minor rearrangements of the mixers. For example, the use of PMOS switches would require that the coupling be tied to Vdd (the power source) rather than the substrate or ground as the figures in this specifications display. However, the rearrangements are minor and are well understood by those of ordinary skill in the art of the present invention.

Figure 2:
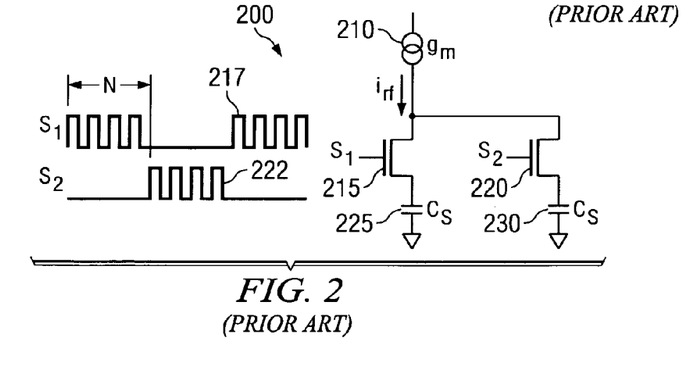
FIG. 2 is a prior art diagram of a current-mode sampling mixer with cyclic charge read-out capability.

With reference now to FIG. 2, there is shown a block diagram illustrating a prior art embodiment of the current-mode sampling mixer 200 with cyclic charge read out. The mixer 200 is essentially the same structurally as the mixer 150 of FIG. 1b. When more than one sampling capacitor is used, the current-mode sampling mixer is sometimes referred to as a multi-tap direct sampling mixer (MTDSM). A second RF switch 220 and sampling capacitor 230 pair allows the task of integrating the RF current to be shared between two sampling capacitors 225 and 230. The RF switches, S1 215 and S2 220, are driven by signals 217 (for switch S1) and 222 (for switch S2). The signals 217 and 222 may be thought of as portions of the signal generated by the LO. For example, the signal 217 may be configured to gate the signal produced by the LO for N cycles and then remain low for the next N cycles and return to gating the LO signal for the next N cycles. The number N is equal to the number of RF cycles the sampling capacitors will integrate the RF current. When the two signals 217 and 222 are combined, the result is the original signal produced by the LO.

When one signal (217 or 222) is gating the signal produced by the LO, the RF switch (215 or 220, respectively) that is controlled by the signal alternates between being closed and open, permitting the RF current to flow to the respective sampling capacitor. When one signal (217 or 222) is gating the signal produced by the LO, the other signal (222 or 217) is low, and the switch associated with the signal is open, not permitting any RF current to reach the sampling capacitor. While one sampling capacitor is busy integrating the RF current, the second sampling capacitor is not integrating the RF current and therefore its charge can be read out. The roles are then reversed to allow the reading of the charge integrated by the first sampling capacitor to be read out. If the capacitance of each of the sampling capacitors is $C_S$, then at any given time, the capacitance seen by the RF current remains $C_S$ because the RF current only sees one sampling capacitor at a time (due to the nature of the signals 217 and 222).

This periodic integration of a number of half-rectified RF samples performs a finite-impulse response (FIR) filtering operation and is sometimes referred to as a temporal moving average (MA). For example, if the number of half-rectified RF samples being integrated in each period is N, then the operation is referred to as a moving average N, or MA-N. The MA-N operation corresponds to an FIR filtering operation with N coefficients, with all coefficients being a constant value (or unity). The FIR filtering operation can be expressed in equation form as:

$$w_i = \sum_{l=0}^{N-1} u_{i-l}.$$

Where: $u_i$ is the i-th RF sample and $w_i$ is the accumulated charge on the sampling capacitor. Due to the fact that the MA-N operation is being read out at the lower rate of once per N RF cycles, aliasing occurs with a foldover frequency at $f_0/2N$. FIR filtering and MA-N operations are considered well understood by those of ordinary skill in the art of the present invention and will not be discussed in detail in these specifications.

It is important to note that the FIR filtering performed by the prior art current-mode sampling mixer 200 may be thought of as an FIR filter with all of the filter coefficients being equal to a constant value (for example, a one value). A constant-coefficient FIR filter is a filter with a first zero of N−1 equidistantly spaced zeroes located at a frequency equal to $f_0/N$, where $f_0$ is the frequency of LO and N is the number of LO cycles that the capacitor $C_S$ accumulates the RF signal prior to having the charge read-out. The constant coefficients are achieved when each of the sampling capacitors, $C_S$, 225 and 230 had the same capacitance and the gain, $g_m$, of the transconductance amplifier 210 is held constant. It is common to desire a filter with more zeroes in order to realize better interference elimination and/or anti-aliasing.

Figure 3:
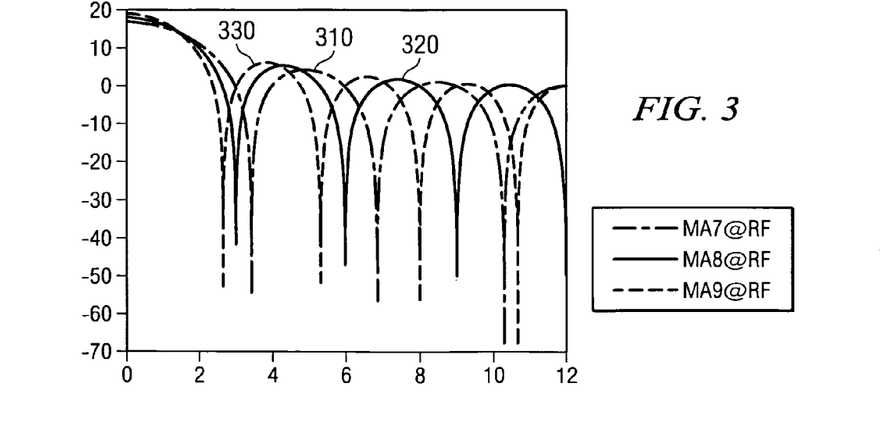
FIG. 3 is a plot of frequency responses for various constant-coefficient FIR filters.

With reference now to FIG. 3, there is shown a data plot illustrating a series of frequency responses for several different constant-coefficient FIR filters. A series of curves 310, 320, and 330 displays the frequency responses of a three different constant-coefficient FIR filters. Each of the three FIR filters may be the result of a single current-mode sampling mixer that is operating with different parameters (such as, different filter lengths). Note the relatively large side lobes adjacent to the main lobe (the largest lobe against the left side of the data plot). The large side lobes reduce the effectiveness of the FIR filters when it comes to anti-aliasing and other general filtering operations.

With reference back to FIG. 2, to achieve a FIR filter with greater roll-off attenuation and deeper notches, the capacitance of the sampling capacitors, $C_S$, 225 and 230 can be changed as a function of time and/or the gain, $g_m$, of the transconductance amplifier 210 can vary as a function of time. For example, if either the capacitance or the gain was changed in a linear fashion, initially increasing and then decreasing, as in a triangular saw-tooth pattern, then the FIR filtering realized by the current-mode sampling mixer will be an arbitrary-coefficient FIR filter with double zeroes that creates double notching, and therefore better anti-aliasing properties near the locations of the zeroes. Note that the manner in which the capacitance or gain is changed can result in a different FIR filter. For example, if the capacitance (and gain) is maintained at a constant level, then a constant-coefficient FIR filter is realized.

Figure 4A:
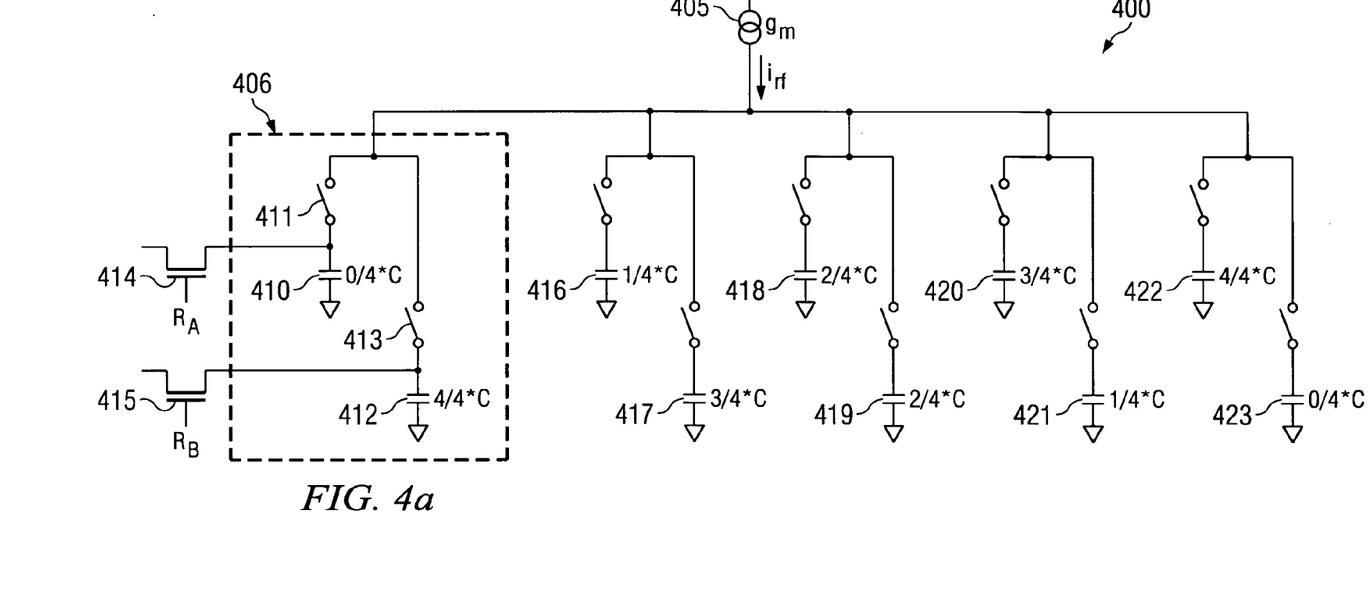
FIGS. 4a-d are diagrams of current-mode sampling mixers with sampling capacitors of differing capacitances and the ability to implement arbitrary-coefficient filtering, according to a preferred embodiment of the present invention.

With reference now to FIG. 4a, there is shown a diagram illustrating a direct RF sampling structure 400 wherein the capacitance of each capacitor seen by an analog RF signal varies with time, but the overall capacitance at any given time remains constant, according to a preferred embodiment of the present invention. The direct RF sampling structure 400, as displayed in FIG. 4a, has five branches, although it should be noted that there is no fundamental restriction on the number of branches in any given sampling structure and that the five branches as shown is simply a trade-off of performance and simplicity.

Each branch, for example, branch 406, is illustrated as having two capacitors, 410 and 412 and two switches 411 and 413. Note that for branch 406, one of the capacitors (capacitor 410) is labeled as having a value of 0/4*C, or 0 C. Of course, this is equivalent to having no capacitor at all. The capacitor 410 is illustrated to maintain consistency and since in a different implementation, the capacitor 410 may actually have a non-zero capacitance. The switch 411 regulates a current flow to the capacitor 410 while the switch 413 regulates a current flow to the capacitor 412. Note that for any given branch, the net capacitance is equal. For example, branch 406 has an overall capacitance of (0/4+4/4)*C=C. Therefore, a transconductance amplifier 405 always sees a constant capacitive load. Additionally, each capacitor on each branch is grouped into one of two groups, group A and group B. For example, group A capacitors can include capacitors 410, 416, 418, 420, and 422 while group B can include capacitors 412, 417, 419, 421, and 423.

The operation of the direct RF sampling structure 400 is as follows: at any given time, only one branch is coupled to the transconductance amplifier 405, with the remaining four branches decoupled. For example, at an exemplary time, the switches 411 and 413 are closed (and all remaining switches are opened), coupling the capacitors 410 and 412 to the transconductance amplifier 405 and accumulating a charge that is proportional to the amount of current that each capacitor receives. Note that the branch structure is sometimes referred to as a current steering structure. Since the capacitors 410 and 412 have different values, the current, $i_{RF}$, is divided proportionally across the two capacitors 410 and 412, depending on the capacitance of the two capacitors 410 and 412. After a period of time, the switches 411 and 413 open and another pair of switches close. This continues until all five branches have had the opportunity to accumulate current.

While the one branch is accumulating the current, one or more of the remaining branches can have its accumulated charge read off. While the charge read-out portion of the direct RF sampling structure 400 was omitted for simplicity's sake, it can be readily realized as a switch coupled to each capacitor that electrically connects each capacitor to a charge read-out circuit. After the charge is read-out, any residual charge can either be reset to zero or left on each capacitor.

A pair of switches 414 and 415 (part of a charge read-out circuit (not shown in its entirety)), controlled by control signals $R_A$ and $R_B$, respectively, couple the capacitors 410 and 412 to the remainder of the charge read-out circuit. The charge read-out circuit extracts the accumulated charge from the capacitors 410 and 412 and converts the accumulated charge into a discrete-time sample. Note that similar switches and charge read-out circuits exist for the remaining branches, but are not shown to maintain simplicity.

The process of current accumulation and charge read-out is continuous, meaning that once all five branches have had an opportunity to accumulate current, the process is repeated. Note however, that as illustrated in FIG. 3, the current accumulation proceeds in a left-to-right and then right-to-left fashion and not in a circular fashion. This is needed to prevent a large discontinuity in the value of capacitors, wherein there will be a sudden change in which the value of the capacitors will suddenly change from its maximum to its minimum value. As an example, the sequence of capacitors accumulating current from group A could proceed as follows: capacitor 410, capacitor 416, capacitor 418, capacitor 420, capacitor 422, capacitor 420, capacitor 418, capacitor 416, capacitor 410, capacitor 416, and so on. A similar sequence of capacitors for group B exists, but is not shown. Note that the accumulated charge by the capacitors in a branch can be read-out at any time after the charge is accumulated, but it must be completed prior to the branch being used to once again accumulate the current.

Figure 4B:
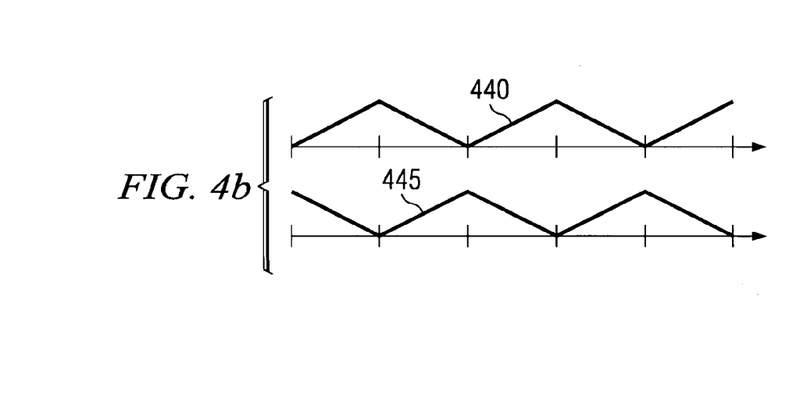

With reference now to FIG. 4b, there is shown a diagram illustrating an example of continuously changing capacitance seen by the transconductance amplifier 405 (FIG. 4a) for capacitors in group A and group B, wherein the change resembles a triangular saw-tooth pattern, according to a preferred embodiment of the present invention. FIG. 4b illustrates the change in the capacitance for capacitors groups A and B if there were an infinite number of capacitors in groups A and B. Note that when the capacitance in one group, for example, group A, increase, then the capacitance in the other group, for example, group B, decreases. Additionally, if at any given instance of time, the capacitance of the capacitor in group A is added with the capacitor in group B, the result is a constant capacitance.

Figure 4C:
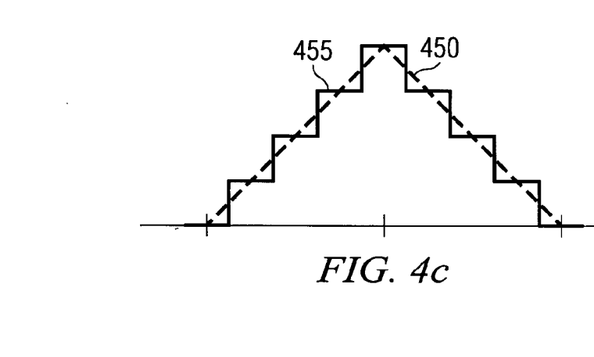

With reference now to FIG. 4c, there is shown a diagram illustrating a single period of one capacitance curve 450 for one group of capacitors, along with an overlay of a stair-step shaped curve 455 representing a capacitance curve when a finite number of capacitors (five in this example) is used, according to a preferred embodiment of the present invention. Since there can only be a finite number of capacitors that is used to reproduce the continuous capacitance curve 450, it is not possible to exactly reproduce the continuous capacitance curve 450. However, given a sufficient number of capacitors, the approximation can be sufficiently close. Notice that the stair-step capacitance curve 455 is similar in appearance to a quantized version of the continuous capacitance curve 450.

Figure 4D:
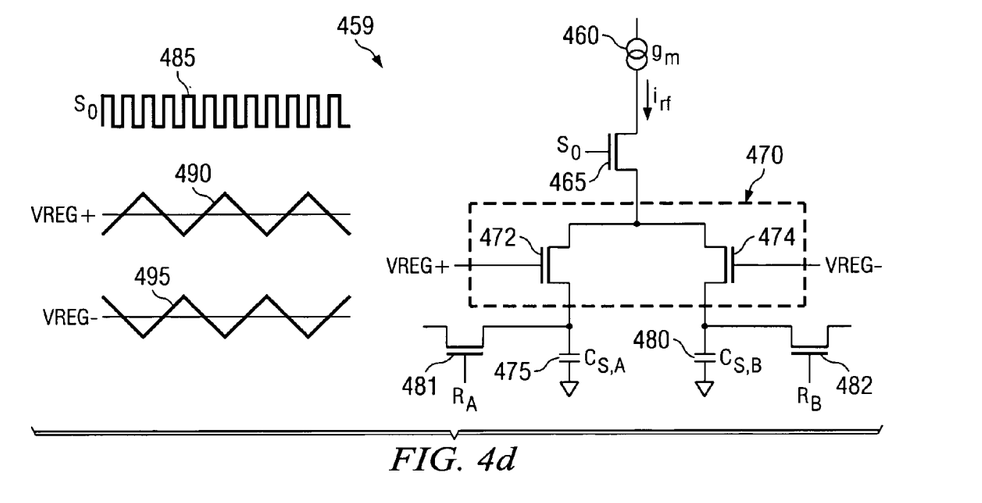

With reference now to FIG. 4d, there is shown a figure illustrating the implementation of a continuous direct RF sampling structure 459 implementing an arbitrary-coefficient FIR filter using a structure of a direct RF sampling structure, according to a preferred embodiment of the present invention. FIG. 4d illustrates a continuous direct RF sampling structure 459 implementing arbitrary-coefficient FIR filtering through the use of transistors to steer a current as produced by a transconductance amplifier 460. Note that the direct RF sampling structure 400 displayed in FIG. 4a is a discrete direct RF sampling structure, wherein switches (for example, switches 411 and 412) switch on and off to regulate current flow. The continuous direct RF sampling structure 459 is continuous in that the current is continually flowing through the transistors when a switch 465 is closed and permits the current to flow.

A pair of transistors 472 and 474 operates as a current steering differential pair. Each of the two transistors 472 and 474 may be controlled by differentially opposed voltages, so that the transistors 472 and 474 can regulate the flow of a current produced by a transconductance amplifier 460. Depending on the state of the two transistors 472 and 474, a varying amount of current can flow through both branches to capacitors 475 and 480 is under the constraint that their sum is equal to $i_{RF}$ (the current produced by the transconductance amplifier 460). Examples of the voltages that may be used to drive the transistors 472 and 474 are displayed as voltages 490 and 495.

According to the magnitudes of the voltages 490 and 495 at the transistors 472 and 474, the current is spit into proportional parts according to the saw-tooth transfer function (as displayed in voltages 490 and 495). For example, if one transistor passes 10% of the current, $i_{RF}$, then the other transistor will pass the remaining 90% of the current, but the total current passed by the two transistors 472 and 474 combined would be the same. The capacitors 475 and 480 would then accumulate a charge that is proportional to the amount of current that each capacitor receives. Note that in order to present constant capacitative load to the RF source, both capacitors should have the same capacitance. According to a preferred embodiment of the present invention, it is also possible to duplicate the switch 465 and then relocate the switches (not shown) to a position below the switches 472 and 474 and so that one switch is directly coupled to each capacitor 475 and 480. The two switches would remain controlled by the signal generated by the LO. The resulting direct RF sampling structure would operate in a similar to the direct RF sampling structure described above.

A pair of switches 481 and 482 (part of a charge read-out circuit (not shown in its entirety)), controlled by control signals $R_A$ and $R_B$, respectively, couple the capacitors 475 and 480 to the remainder of the charge read-out circuit. The charge read-out circuit extracts the accumulated charge from the capacitors 475 and 480 and converts the accumulated charge into a discrete-time sample.

The number of branches in a direct RF sampling structure can be increased to achieve a better approximation of the continuous capacitance curves. However, as the number of branches exceeds a certain number, perhaps six or seven, it becomes unwieldy to create a large number of branches. Additionally, producing a large number of capacitors with each capacitor having essentially a different capacitance can be difficult. A more regular pattern is needed if an extraordinarily large number of capacitors are to be used in the direct RF sampling structure.

Figure 5:
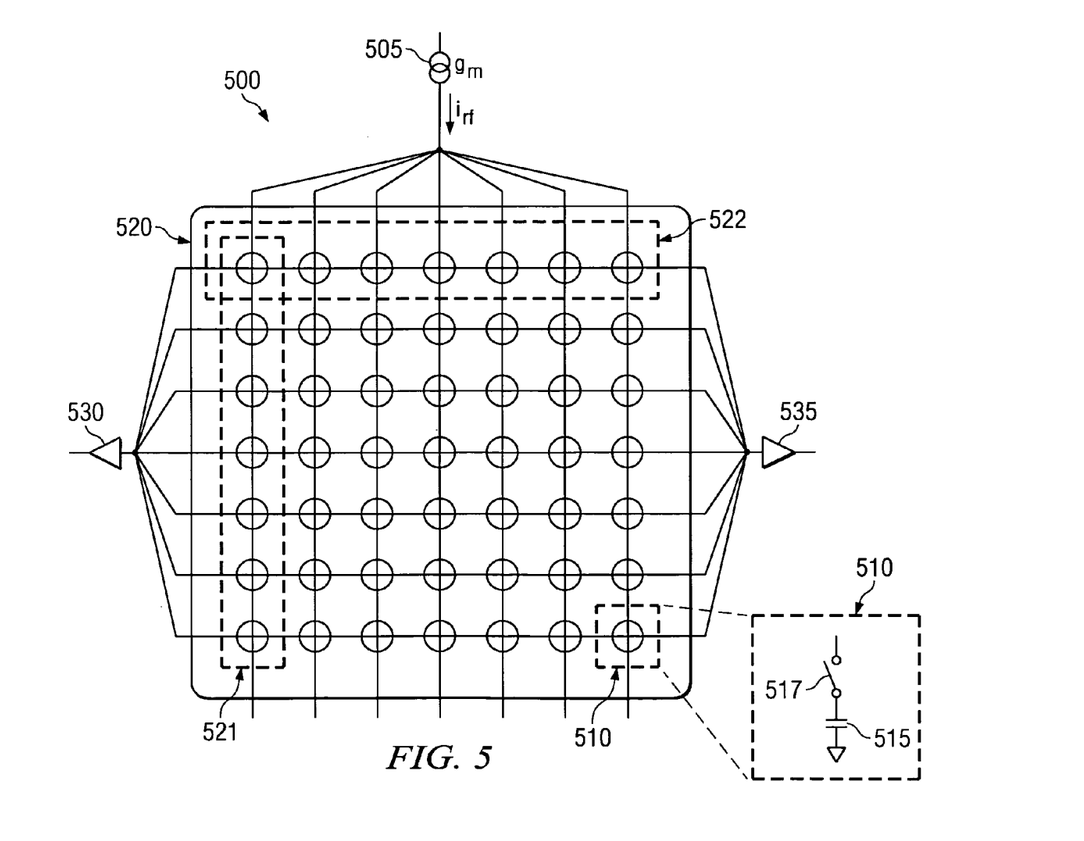
FIG. 5 is a diagram of a current-mode sampling mixer with an array of sampling capacitors, capable of providing high-resolution approximation of a continuous capacitance curve, according to a preferred embodiment of the present invention.

With reference now to FIG. 5, there is shown a direct RF sampling structure 500 that can support an extra-ordinarily large number of capacitors to provide an excellent approximation of a continuous capacitance curve, according to a preferred embodiment of the present invention. Rather than arranging pairs of capacitors and switches in branches, the capacitors and switches are arranged in an array 520 of capacitors and switches. Note that each capacitor in the array 520 has the same capacitance, making it much easier to create the capacitors and the array 520. The array 520 is made up of columns of j capacitors (for example, column 521) and rows of i capacitors (for example, row 522) arranged in a cross-point grid. The array 520, therefore, has a total of i*j capacitors and switches.

Highlight 510 provides a detailed view of a single capacitor 515 and switch 517 combination. The capacitor 515 is coupled to the cross-point grid via the switch 517. The switch 517 is, in turn, controlled by a control signal (not shown). Each capacitor can be addressed by its column and row index, for example, capacitor 515 may be addressed as (6, 6), assuming that a capacitor with an address (0, 0) is at the upper left hand corner of the array 520.

The operation of the direct RF sampling structure 500 is similar to the direct RF sampling structure 400 (FIG. 4a), with only one column (for example, column 521) being coupled to a transconductance amplifier 505 at any given time, and the remaining columns being decoupled. However, in the direct RF sampling structure 500, everyone of the j capacitors in the column accumulate the current. Once one column has accumulated the current for a specified amount of time, the column becomes decoupled from the transconductance amplifier 505 and a column adjacent to that column becomes coupled to the transconductance amplifier 505. The process continues, with the coupled column sweeping across the array 520.

After a column accumulates the current for the specified amount of time, the charge accumulated is read-out. For any given column, a specified number of capacitors is coupled to an A buffer 530 and the remaining capacitors in the row are coupled to a B buffer 535. For example, in column 521, one capacitor may be coupled to the A buffer 530 while the remaining six capacitors are coupled to the B buffer 535. Therefore, the A buffer 530 receives a charge proportional to $1/7^{th}$ of the total charge accumulated, while the B buffer 535 receives a charge proportional to $6/7^{th}$ of the total accumulated charge. In the column adjacent to row 521, the A buffer 530 may receive $2/7^{th}$ of the charge (two capacitors) and the B buffer 535 receives $5/7^{th}$ of the total charge (five capacitors), and so on.

According to a preferred embodiment of the present invention, the number of capacitors coupled to a particular buffer (530 or 535) can be configured dynamically, so that the FIR filter coefficients can be changed on the fly. According to yet another preferred embodiment of the present invention, the array 520 can be replaced with a charge coupled device (CCD) (not shown) of similar topology.

Charge coupled devices (CCDs) are metal oxide semiconductor (MOS) capacitors formed into a linear string. CCDs can store and transfer analog charge signals and can be used for various types of signal processing applications such as electronically variable delay lines and transversal filters. CCDs store and transfer charge (which represents information) between potential wells at or near the surface of the substrate. A charge is placed in the potential wells by applying a voltage across the wells. This charge can represent information carried on the current provided by the transconductance amplifier. CCDs are well known by those of ordinary skill in the art of the present invention.

An additional method that can be used to effectively change the FIR coefficients is to vary the gain, $g_m$, of the transconductance amplifier. When the gain of the transconductance amplifier is varied in a desired pattern and the capacitance seen by the transconductance amplifier is kept constant, the net effect is that a varying amount of charge is accumulated onto the capacitors, hence yielding arbitrary FIR coefficients.

Figure 6:
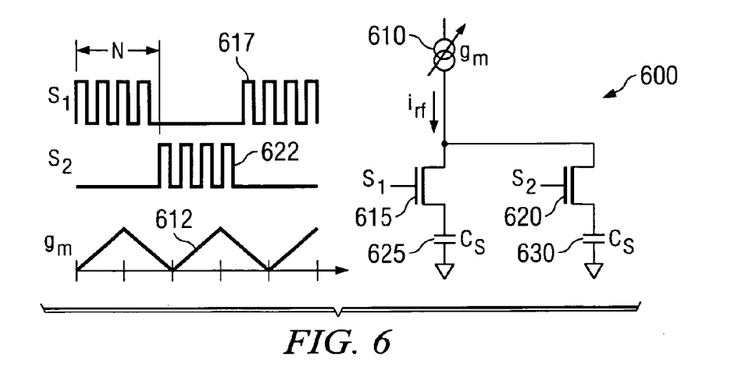
FIG. 6 is a diagram of a current-mode sampling mixer with a variable gain transconductance amplifier, according to a preferred embodiment of the present invention.

With reference now to FIG. 6, there is shown a schematic of a direct RF sampling structure 600 wherein a gain of a transconductance amplifier 610 is varied according to a specified pattern to obtain arbitrary-coefficient FIR filtering, according to a preferred embodiment of the present invention. The direct RF sampling structure 600 is similar to the direct RF sampling structure 200 (FIG. 2) with the exception of a variable gain transconductance amplifier 610. A gain curve 612 displays an exemplary trace of the gain of the transconductance amplifier 610. A pair of switches 615 and 620, driven by signals S1 617 and S2 622, gate the output of the transconductance amplifier 610 to a pair of capacitors 625 and 630. According to a preferred embodiment of the present invention, the capacitors 625 and 630 have equal capacitance.

The charge accumulated on the capacitors 525 and 530 can be read-out by charge read-out circuits (not shown) when the capacitor is not actively accumulating the current.

Note that the gain of the transconductance amplifier 610 must be set so that at its maximum, there remains sufficient dynamic range so that an input signal does not cause the transconductance amplifier 610 to clip. Clipping of the input signal would result in loss of information and distortion, with the amount of information depending on the degree of clipping.

The removal of out-of-band interferers can be achieved through the use of analog filters. These analog filters can be located as early in a radio receiver as immediately after an antenna. If the out-of-band interferers are located a relatively large distance (in frequency terms) away from a signal of interest, then it is possible to use low-order analog filters that are relatively easy to implement out of a relatively small number of components. However, if the out-of-band interferers are close to the signal of interest (commonly referred to as close-in interferers), then high-order analog filters are required to eliminate the interferers. High-order analog filters can be hard to implement in an integrated circuit and at the very least, they can consume a significant amount of real-estate.

If the close-in interferers cannot be eliminated, then it is common to require that RF front-end electronics have a good degree of linearity to handle the potentially large dynamic range of the both the signal of interest and the interferers. For example, it is common to encounter interferers that are several orders of magnitude larger than the signal of interest. Therefore, in order to prevent loss of important information in the signal of interest, RF front-end electronics must have sufficient linearity to process both the signal of interest and the interferers without (significant) distortion. This requirement for linearity raises the overall cost of the radio receiver.

Figure 7:
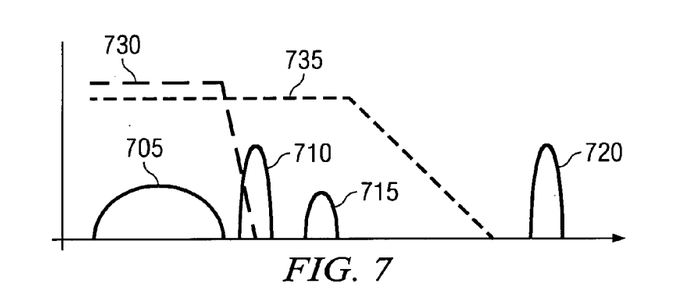
FIG. 7 is a diagram displaying a signal of interest along with several interferers, according to a preferred embodiment of the present invention.

With reference now to FIG. 7, there is shown a diagram illustrating a signal of interest 705 along with some interferers, according to a preferred embodiment of the present invention. The signal of interest 705 is shown adjacent to two close-in interferers 710 and 715 and a far-away interferer 720. Note that as illustrated, the magnitudes of some of the interferers, namely interferers 710 and 720 are significantly greater than the magnitude of the signal of interest 705. As stated above, the interferers may be several orders of magnitude (or more) larger than the signal of interest 705. However, FIG. 7 does not display this behavior.

Also shown in FIG. 7 is a frequency response of a low-order low-pass filter (LPF) 735 that can be used to eliminate the far away interferer 720. Additionally, a frequency response of a high-order LPF 730 that can be used to eliminate all three of the interferers. Note that since the close-in interferer 710 is so close to the signal of interest 705, it may not be possible to completely eliminate the close-in interferer 710 with the high-order LPF 730 as displayed. Perhaps it would be possible to use a higher order LPF (not shown) to completely eliminate the close-in interferers.

As an alternative to using analog filters in a radio receiver's analog front-end to eliminate the close-in interferers (the far away interferers can be easily eliminated by a low-order LPF), an iterative technique using feedback information and digital filters can be used to remove the close-in interferers and linearize a sampling structure of a direct RF radio receiver. By linearizing the sampling structure, the linearity of the analog front-end can be relaxed, resulting in lower overall power consumption and a less expensive direct RF radio receiver. A basic idea of the technique is to use digital filters in place of analog filters, where it is easy and inexpensive to create high-order filters.

Figure 8:
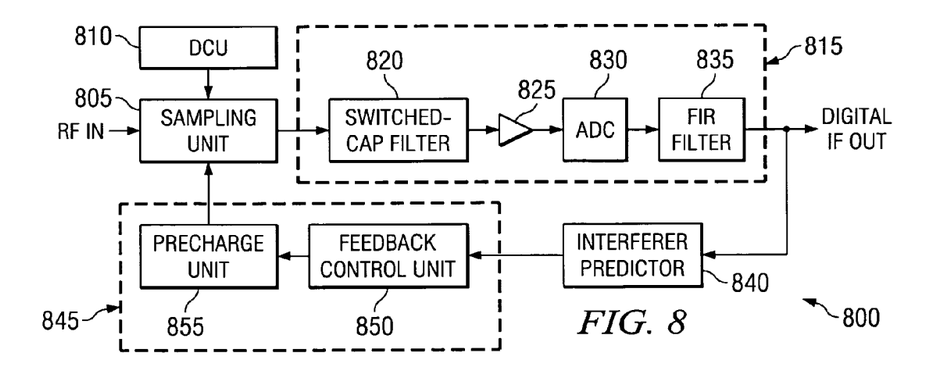
FIG. 8 is a diagram displaying a portion of a direct RF radio receiver with built-in close-in interference elimination through feedback information, according to a preferred embodiment of the present invention.

With reference now to FIG. 8, there is shown a block diagram of a portion of a direct RF radio receiver 800 with built-in close-in interference elimination through feedback information, according to a preferred embodiment of the present invention. For a more detailed explanation of the operation of the basic direct RF radio receiver, refer to a related co-pending and co-assigned patent application Ser. No. 10/190,867, filed Jul. 8, 2002, entitled "Direct Radio Frequency (RF) Sampling with Recursive Filtering Method", which is incorporated herein by reference.

Briefly, the direct RF radio receiver 800 has as its input an analog continuous-time RF signal. The analog RF signal may or may not have been filtered to eliminate some of the out-of-band signals. A sampling unit 805 preferably uses a current-mode sampling mixer to create a discrete-time sample stream from the analog RF signal. The discrete-time sample stream is then filtered, buffered, and converted into a digital bitstream by a signal processing unit 815. The digital bitstream is then provided to digital circuitry that provides further processing of the signal to turn it into a usable form for a digital processor (not shown) attached to the direct RF radio receiver 800. The sampling unit 805 is controlled by a digital control unit (DCU) 810 that is responsible for generating control and timing signals.

The built-in close-in interference elimination is provided via an interference predictor 840, whose function is to predict the interferers and provide the information regarding the interferers to a feedback circuit 845. The feedback circuit 845 uses the information from the interference predictor 840 and using destructive combination, eliminates the interferers in the sampling unit 805. Through an iterative process of predicting the interferers in the interferer predictor 840 and eliminating them in the sampling unit 805, the technique ends up linearizing the sampling unit 805.

For example, a first time through the direct RF radio receiver 800, when there is no feedback information about any interferers, all interferers pass through to an output of the signal processing unit 815. It is only after the first time that the digitized version of the analog RF signal goes through the direct RF radio receiver 800 that the interferer predictor 840 is able to produce any information about interferers that may exist in the digital bitstream. This information is then passed back to the sampling unit where it is eliminated from the discrete-time sample stream.

According to a preferred embodiment of the present invention, the interferer predictor 840 can be as simple as a band-pass filter (BPF) or high-pass filter (HPF) that is set to reject the signal of interest and filter out the interferers. The BPF or the HPF can be digital filters of a needed order to ensure that the signal of interest is completely eliminated. Since digital filters are "software" filters (not resistors, capacitors, and inductors), it is relatively easy to create digital filters of arbitrary order. By choosing to eliminate the signal of interest, the interferer predictor 740 may provide feedback information about every component other than the signal of interest existing in the digital bitstream. Alternatively, the interferer predictor 840 may be a predictor in general and specifically, a linear predictor. Predictors, linear predictors and the use of BPFs and HPFs to produce information about interferers are well known by those of ordinary skill in the art of the present invention.

Due to the fact that the sampling unit 805 is a current-mode sampling mixer, simple mathematical subtraction of the feedback information does not apply to the elimination of any predicted interferers. Rather, the feedback information must be accumulated by sampling capacitors in the sampling unit 805. It is through charge sharing that the feedback information is used. Please refer to a co-pending and co-assigned patent application Ser. No. 10/147,784, filed May 16, 2002, entitled "Efficient Charge Transfer Using a Switched Capacitor Resistor" for a more detailed explanation of how the feedback circuitry makes use of feedback information.

The feedback information provided to the sampling unit 805 for close-in interferer rejection can be over-sampled and noise shaped. In this configuration, a DAC (which can be a part of the interferer predictor 840 or the feedback circuit 845) can be a sigma-delta digital-to-analog converter which provides noise shaped output to the sampling unit 805. The filtering in the receiver is used to reject the shaped quantization noise as it is already there.

Figure 9A:
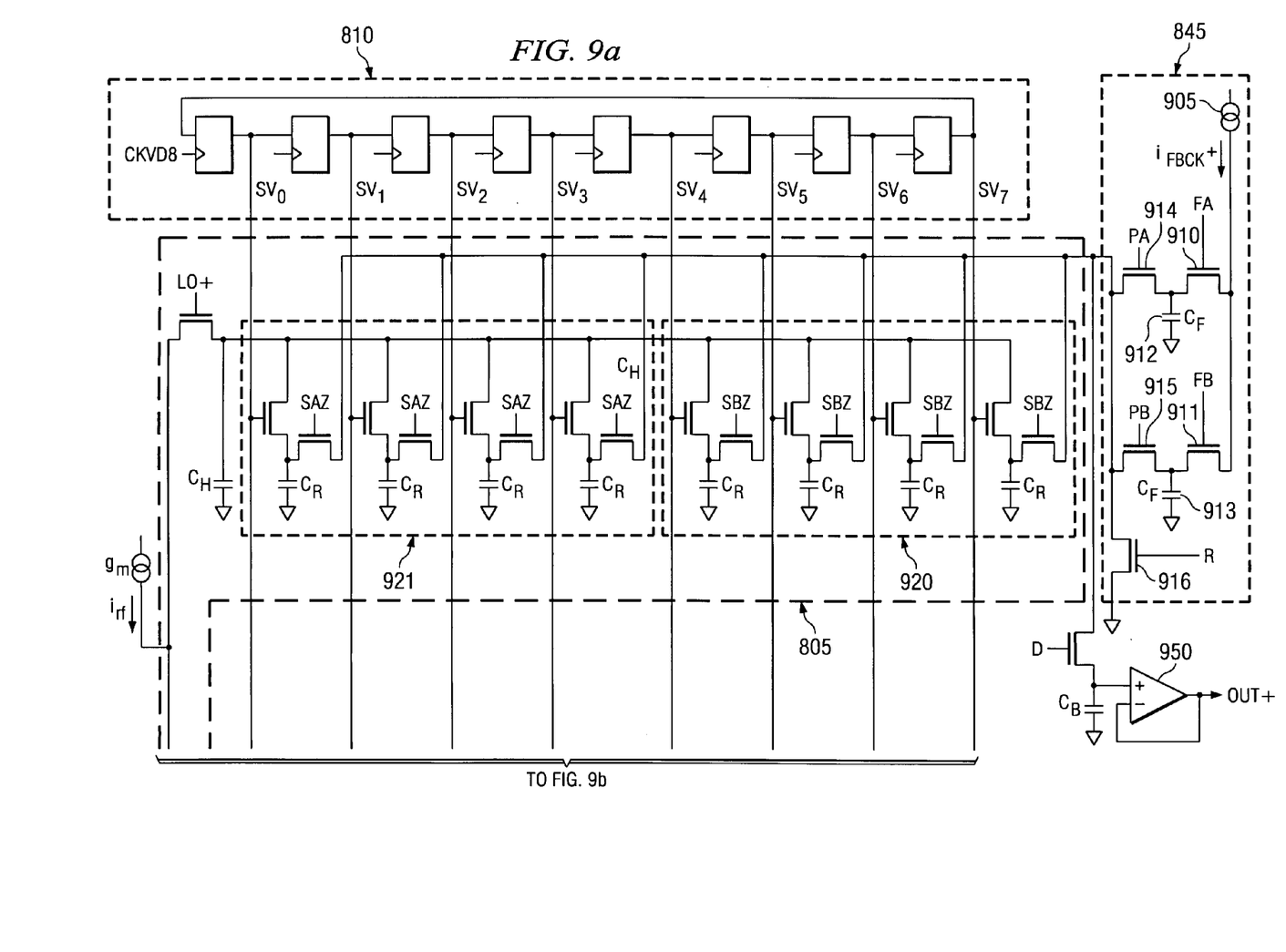
FIG. 9 is a diagram displaying a schematic view of a portion of a direct RF radio receiver with built-in close-in interference elimination through feedback information, according to a preferred embodiment of the present invention.
Figure 9B:
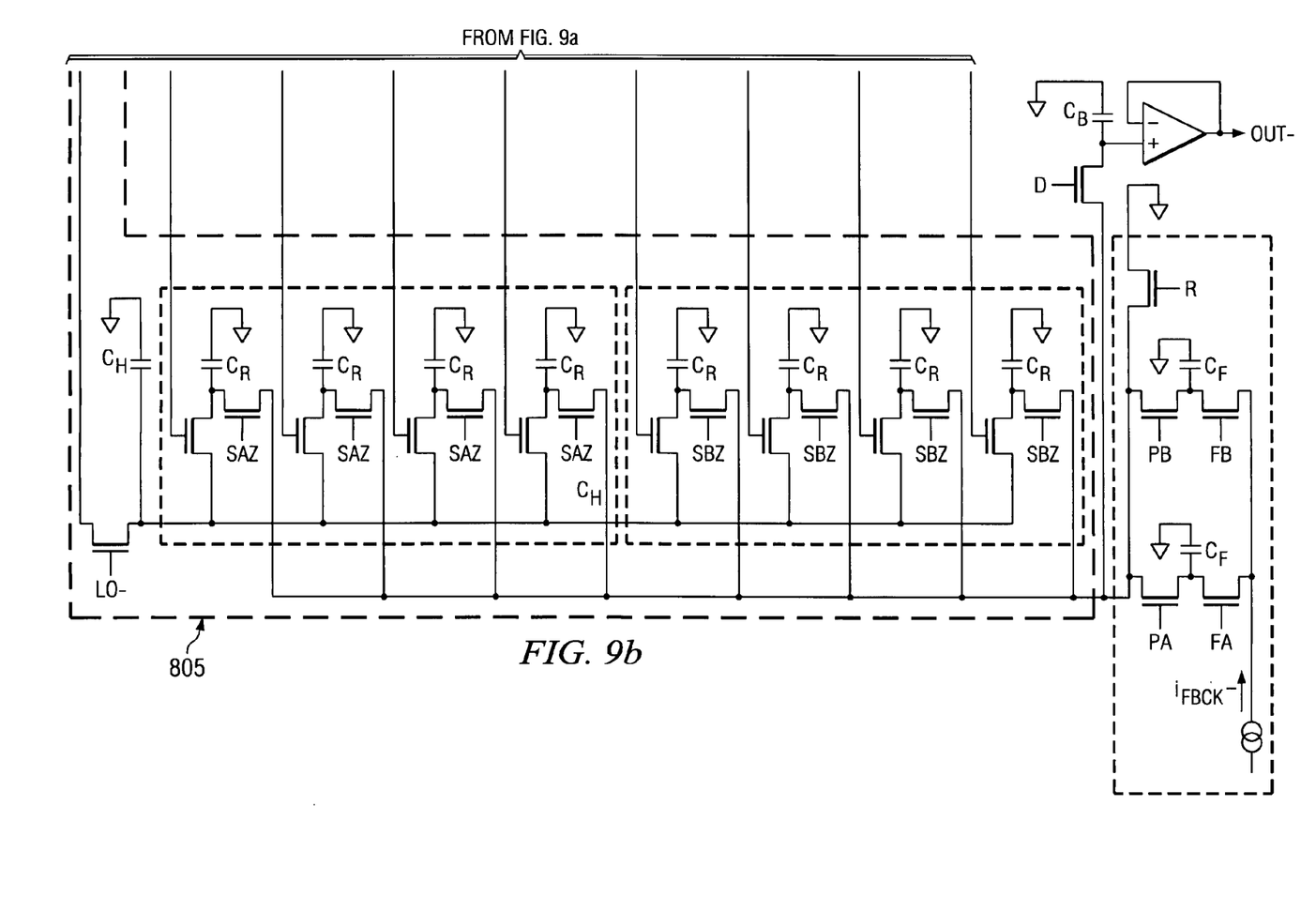

With reference now to FIG. 9, there is shown a schematic diagram of a portion of the direct RF radio receiver 800 (FIG. 8), with detailed views of the sampling unit 805, DCU 810, and feedback circuit 845, according to a preferred embodiment of the present invention. Note that the schematic diagram displays only a portion of a complete direct RF radio receiver 800. A buffer 950 represents an output buffer of the sampling unit 805. What is shown is an LO+ and LO− portion of either an in-phase (I) or quadrature-phase (Q) signal path for a direct RF radio receiver operating in differential mode. The LO+ and the LO− (for either the I or Q signal paths) portions are essentially similar and a description of one portion will also sufficiently describe the other.

Once again, detailed explanations of the operation of the sampling unit 805 and the DCU 810 can be found in the related patent application Ser. No. 10/190,867, filed Jul. 8, 2002, entitled "Direct Radio Frequency (RF) Sampling with Recursive Filtering Method".

Taking a closer look at the feedback circuit 845, there is a current source 905 that is used to represent the feedback information, in the form of a feedback current, $i_{FBCK}$, provided by the interferer predictor 840 (FIG. 8, not shown in FIG. 9). The feedback current is accumulated by a pair of capacitors, $C_F$, 912 and 913, whenever switches 910 and 911 are closed. The switches are controlled by signals generated by the DCU 810. One of the capacitors is used to accumulate the feedback current for one capacitor bank 920 of the sampling unit 805 and the other capacitor is used to accumulate the feedback current for the other capacitor bank 921 of the sampling unit 805. The two feedback capacitors 912 and 913 are coupled to the sampling unit 805 by switches 914 and 915.

After one the two capacitors 912 or 913 has accumulated the feedback current for a specified amount of time, one of the two switches 914 or 915 is closed and the capacitor is coupled to the corresponding capacitor bank of the sampling unit 805, and the charge accumulated by the capacitor is shared with the capacitors in the capacitor bank. This process operates continuously to provide the feedback information to both capacitor banks of the sampling unit 805.

Figure 10:
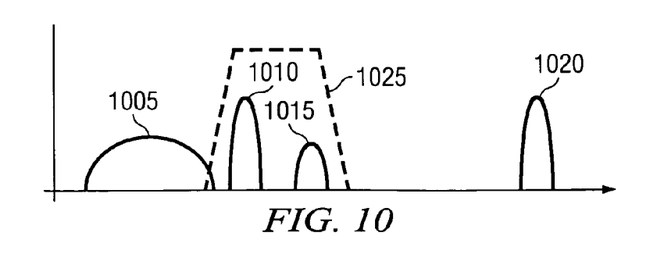
FIG. 10 is a diagram displaying a signal of interest and several interferers, and how a band-pass filter can be used to provide interferer prediction.

With reference now to FIG. 10, there is shown a diagram illustrating a signal of interest 1005 along with several interferers 1010, 1015, and 1020, and how a band-pass filter can be used to provide interferer information, according to a preferred embodiment of the present invention. The signal of interest 1005 is shown with the pair of close-in interferers 1010 and 1015 and the far away interferer 1020. Also shown is a frequency response 1025 of a band-pass filter that eliminates everything outside of its lines. Therefore, a majority of the signal of interest 905 is eliminated and the far-away interferer 1020 is also eliminated. The band-pass filter retains the two close-in interferers 1010 and 1015. A signal conveying this information is fedback to the sampling unit via charge accumulation and then charge sharing so that the two close-in interferers 1010 and 1015 can be eliminated from the discrete-time sample stream that is generated by the sampling unit.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for removing interferers comprising:
    creating a discrete-time sample stream (DTSS) from an analog continuous-time radio frequency (RF) signal, wherein a sampling unit is used to create DTSS from the analog RF signal, and wherein a sampling capacitor accumulates a charge based on the analog RF signal; converting the DTSS into a digital data stream (DDS); predicting a presence of interferers in the DDS; feeding back information about the predicted interferers; and eliminating the predicted interferers from the DTSS.

2. The method of claim 1, wherein the predicting is performed by a high-pass filter that eliminates a desired signal.

3. The method of claim 2, wherein the predicting is performed by a band-pass filter that eliminates a desired signal.

4. The method of claim 1, wherein the predicting is performed by a predictor.

5. The method of claim 4, wherein the predicting is performed by a linear predictor.

6. The method of claim 1, wherein the feeding back is performed by charge sharing a charge from a feedback capacitor with the sampling capacitor in the sampling unit, and wherein the shared charge is used to eliminate the predicted interferer from the DTSS.

7. The method of claim 1, wherein the feeding back also provides over-sampling and noise shaped filtering of the information about the predicted interferers.

8. A radio frequency (RF) radio receiver comprising:
    a signal input;
    a sampling unit coupled to the signal input, the sampling unit containing circuitry to convert an analog signal provided by the signal input into a discrete-time sample stream (DTSS);
    a signal processing unit coupled to the sampling unit, the signal processing unit containing circuitry to filter and convert the DTSS into a digital data stream (DDS);
    an interferer predictor unit coupled to an output of the signal process unit, the interferer predictor unit containing circuitry to detect and provide information regarding interferers in the DDS; and
    a feedback circuit having an input coupled to the interferer predictor unit and an output coupled to the sampling unit, the feedback circuit containing circuitry to provide the information produced by the interferer predictor unit to the sampling unit.

9. The RF radio receiver of claim 8, wherein the sampling unit is a current-mode sampling mixer.

10. The RF radio receiver of claim 8, wherein the interferer predictor unit is a band-pass filter, and wherein the band-pass filter is set to filter out a signal of interest and high-frequency noise from the DDS.

11. The RF radio receiver of claim 8, wherein the interferer predictor unit is a high-pass filter, and wherein the high-pass filter is set to filter out a signal of interest from the DDS.

12. The RF radio receiver of claim 8, wherein the interferer predictor unit is a predictor.

13. The RF radio receiver of claim 12, wherein the interferer predictor is a linear predictor.

14. The RF radio receiver of claim 8, wherein the sampling unit is a current-mode sampling mixer that uses sampling capacitors to sample the analog signal and produce the DTSS, wherein the feedback circuit uses charge sharing to place a charge on the sampling capacitors from a charge accumulated on a feedback capacitor, and wherein the charge placed on the sampling capacitors conveys information regarding the interferers.

15. The RF radio receiver of claim 14, wherein the charge placed on the sampling capacitors eliminates the interferers from the DTSS being created by the sampling unit.

16. The RF radio receiver of claim 14, wherein the information regarding the interferers are over-sampled and noise shape filtered.

17. The RF radio receiver of claim 8, wherein the RF radio receiver is used in a Bluetooth compliant wireless communications network.

18. The RF radio receiver of claim 8, wherein the RF radio receiver is used in a cellular telephone communications network.

19. The RF radio receiver of claim 8, wherein the signal processing unit comprises:
    a filter coupled to the sampling unit, the filter to band limit the DTSS; and
    an analog-to-digital converter (ADC) coupled to the filter, the ADC to convert the DTSS into the DDS.

* * * * *